United States Patent
Li et al.

(10) Patent No.: US 12,248,779 B1
(45) Date of Patent: Mar. 11, 2025

(54) TOGGLE PERSIST WITH RUNTIME VIEW OPTIMIZATION

(71) Applicant: Workday, Inc., Pleasanton, CA (US)

(72) Inventors: Zhenpeng Li, San Ramon, CA (US);
Dustin Chesterman, Fremont, CA (US); Samuel Kheng, San Jose, CA (US); Sachin Morajkar, San Carlos, CA (US)

(73) Assignee: Workday, Inc., Pleasanton, CA (US)

( * ) Notice: Subject to any disclaimer, the term of this patent is extended or adjusted under 35 U.S.C. 154(b) by 185 days.

(21) Appl. No.: 17/890,752

(22) Filed: Aug. 18, 2022

(51) Int. Cl.
*G06F 8/71* (2018.01)

(52) U.S. Cl.
CPC ...................................... *G06F 8/71* (2013.01)

(58) Field of Classification Search
USPC ........................................................ 717/122
See application file for complete search history.

(56) References Cited

U.S. PATENT DOCUMENTS

| | | | |
|---|---|---|---|
| 11,507,877 B2* | 11/2022 | Vadella | G06N 20/00 |
| 2013/0055232 A1* | 2/2013 | Rajan | G06F 8/658 |
| | | | 717/170 |
| 2016/0092197 A1* | 3/2016 | Kuchibhotla | G06F 8/65 |
| | | | 717/170 |
| 2022/0222068 A1* | 7/2022 | Look | G06F 8/71 |
| 2022/0391189 A1* | 12/2022 | Padubidri | G06F 8/71 |

* cited by examiner

*Primary Examiner* — Qing Chen
*Assistant Examiner* — Clint Thatcher
(74) *Attorney, Agent, or Firm* — Van Pelt, Yi & James LLP (57) ABSTRACT

A version of a software application is determined to be analyzed. The states of toggles associated with the version of the software application are analyzed to identify changed states of at least a portion of the toggles. A changed state of the changed states comprises a state of a toggle of the toggles that has changed during execution of the version of the software application. The changed state has a corresponding time frame and a corresponding sequence number. The changed states are logged.

20 Claims, 5 Drawing Sheets

TOGGLE PERSIST WITH RUNTIME VIEW OPTIMIZATION

BACKGROUND OF THE INVENTION

A software application for a given tenant is comprised of a plurality of different code paths. Each code path is associated with a corresponding toggle. A toggle is a flag in a software application that indicates whether a code path associated with the toggle should be executed during runtime. Tenant applications can have thousands of toggles and with thousands of tenants, tracking all of the toggle states that can change every week is a problem.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A version of a software application is comprised of a plurality of code paths. A first version of the software application differs from a second version of the software application based on which code paths have been enabled. For example, the first version may include a first set of enabled code paths and the second version may include a second set of enabled code paths. There may be one or more overlapping code paths between the first set and second set.

A version of the software application may be generated by updating the software application to include one or more features (e.g., software patch). The one or more features have corresponding code paths and toggles. Toggles are necessary to roll out features to a version of the software application running without actually enabling the feature. A feature may be enabled by enabling the toggle associated with the feature. As a result, the code path associated with the feature will be executed during runtime.

Toggles may be quickly overridden if the features associated with toggles do not behave as expected. A software application may be debugged by analyzing the code paths of the software application that were executed during runtime. Other systems may log the corresponding states of all toggles associated with a version of the software application. A software developer may update the software application according to a schedule (e.g., weekly). For example, a software application associated with a customer environment (which may host thousands of tenants) may have more than 220 million toggle runtime states and the software application may be patched on a weekly schedule. This requires storing more than 11.5 billion toggle data records in a year for a customer environment. In addition, the number of toggles per tenant, and the number of tenants per environment keep growing. Given the number of code paths in a software application and the number of software updates, the number of logged toggle states to be stored becomes unbounded. As a result, a large amount of storage may be required to store all of the logged toggle states.

A technique to reduce the rate at which storage is needed to store the toggle states associated with different versions of a software application is disclosed. A computing device (e.g., server, computer, laptop, desktop, tablet, smart device, etc.) may execute a version of the software application in an environment, such as a production environment, a test environment, a sandbox environment, etc.

The software application is comprised of a plurality of different code paths. An analysis system determines to analyze the software application to determine states of toggles associated with the different code paths. This enables a developer and/or a debugger to determine which code paths were enabled during execution of the software application. The analysis system may determine to analyze the software application based on an analysis schedule (e.g., every Friday) or in response to a user command.

An analysis system includes a toggle state analyzer to determine states of toggles during runtime. In some embodiments, the analysis system is the computing device on which the software application was executed. In some embodiments, the analysis system is a different computing device on which the software application was executed.

An initial version of the software application includes a first plurality of code paths and corresponding toggle states. In some embodiments, a toggle state associated with a code path has an initial or default state of "TRUE." In some embodiments, a toggle state associated with a code path has an initial or default state of "FALSE." The initial states associated with the toggles are stored in a toggle state data structure (e.g., table, list, etc.). The toggle state data structure includes a corresponding entry for each toggle.

An entry for a toggle may associate the toggle with a "tenant identifier" value, a "sequence number" value, a "toggle name" value, a "start version" value, a "version" value, a "start datetime" value, a "last datetime" value, and/or a "toggle state" value. The "tenant identifier" value indicates a tenant to which the software application is associated. The "sequence number" value indicates a software application iteration for the software application. For example, the software application may be updated (e.g., once a week, in response to a user command by turning on/off toggles, adding one or more features) and the "sequence number" increments (e.g., by 1) each time the software application is updated. The "toggle name" value indicates a name of the toggle." The "start version" value indicates a version of the software application in which the code path associated with the toggle was deployed. The "version" value indicates the most recent version of the software application that includes the toggle having the toggle state. The "toggle state" value indicates a state of the toggle.

The "start datetime" value indicates a point in time for the initial value associated with the toggle. The "last datetime" value indicates the last time the toggle had the toggle state stored in the toggle state data structure. The "start datetime" value and the "latest datetime" value represent the timeframe during which the toggle has the value indicated by the entry.

The analysis system analyzes states of toggles associated with a version of the software application to identify changed states of at least a portion of the toggles. A toggle of the plurality of toggles is selected. The analysis system utilizes the toggle state data structure to compare a current state associated with a toggle to a stored state associated with the toggle and to determine whether a state associated with the toggle has changed.

In some embodiments, the current state associated with the toggle is different than the stored state associated with the toggle. In response to a determination that the toggle state has changed, the analysis system logs the change by updating the toggle state data structure to include a new entry for the toggle and modifying the previous entry associated with the toggle. The new entry may associate the toggle with a "tenant identifier" value, a "sequence number" value, a "toggle name" value, a "start version" value, a "version" value, a "start datetime" value, a "last datetime" value, and/or a "toggle state" value. The "sequence number" value is updated to indicate the software application iteration at which the toggle value changed.

The "sequence number" value and "last_datetime" value of the previous entry associated with the toggle are modified. The "sequence number" value is updated to be one less than the current sequence number associated with the software application. For example, the current sequence number may be n and the "sequence number" value for the previous entry associated with the toggle is modified to be (n−1). The "latest datetime" value is updated to be the point in time at which the previous version of the software application was executed.

In some embodiments, the current state associated with the toggle is the same as the stored state associated with the toggle. In response to a determination that the toggle state has not changed, the analysis system updates the "sequence number" value, the "version" value in the entry associated with the toggle, and the "last datetime" value in the entry associated with the toggle. The "sequence number" value is updated to be the sequence number associated with the current version of the software application. The "version" value in the entry associated with the toggle is updated to be version number of the current version of the software application. This indicates that the stored state associated with the toggle is the state of the toggle in the current version of the software application. The "latest datetime" value is updated to be the point in time at which the current version of the software application was executed.

In some embodiments, the toggle state data structure does not include an entry for the toggle, i.e., the code path associated with the toggle is a new feature. In response to a determination that the toggle state data structure does not include an entry for the toggle, the analysis system updates the toggle state data structure to include an entry for the toggle. The new entry may associate the toggle with all of the following: a "tenant identifier" value, a "sequence number" value, a "toggle name" value, a "start version" value, a "version" value, a "start datetime" value, a "last datetime" value, and a "toggle state" value.

The analysis system repeats the above process for each of the toggles associated with the version of software. As a result, the rate at which storage is needed to store the states of toggles associated with the version of software is reduced because the toggle state data structure is updated to include entries for a subset of the toggles associated with the executed version of the software application (e.g., new toggle(s) and/or toggle(s) associated with changed states).

The system improves the computer by improving storage efficiency associated with storing toggles. In some embodiments, the number of entries of stored states of toggles is reduced from every state of a toggle being stored to only those toggle values that have changed from a previous set of stored toggle states to a current set of toggle states.

Figure 1:
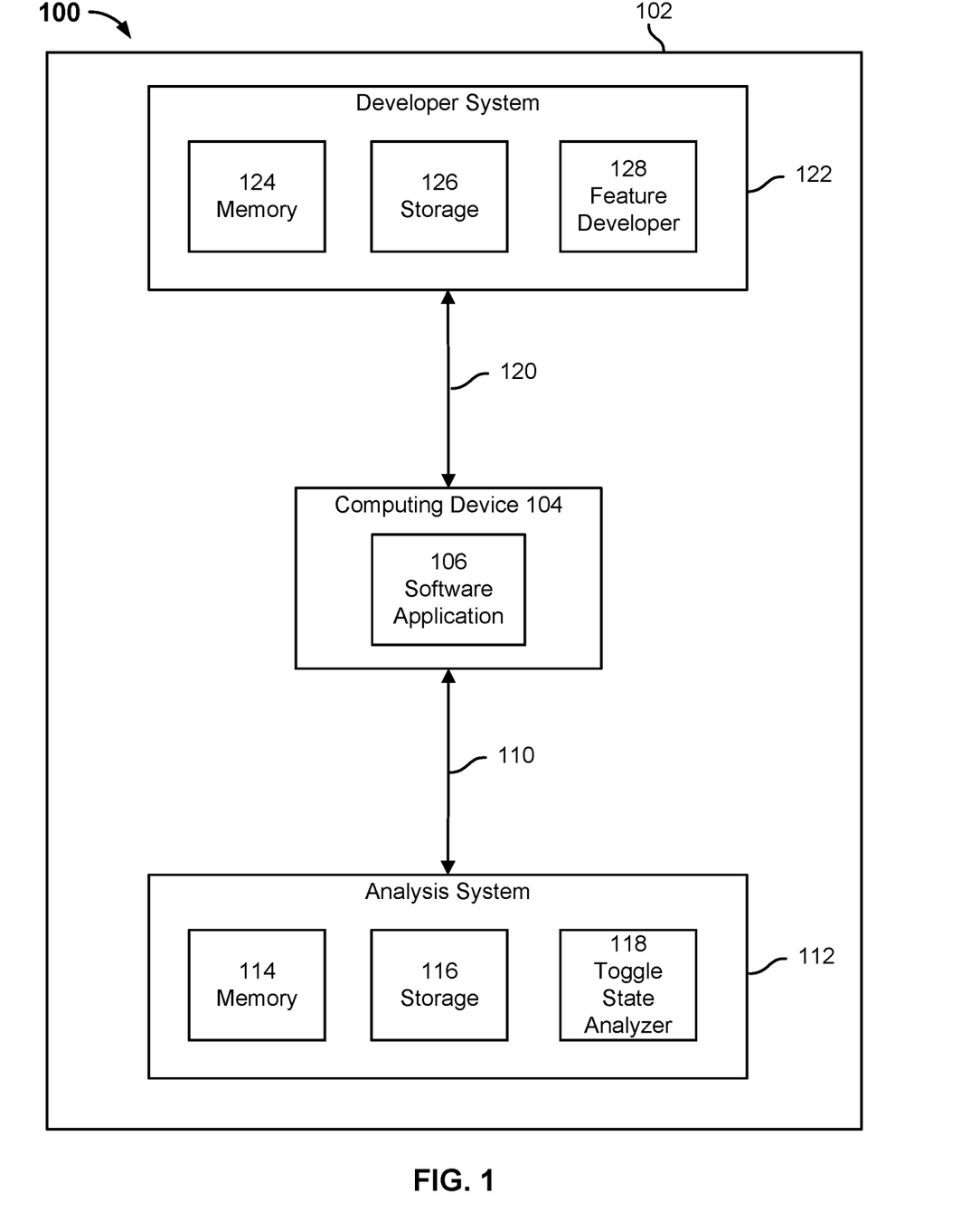
FIG. 1 is a block diagram illustrating an embodiment of a system for storing toggle states associated with a software application.

FIG. 1 is a block diagram illustrating an embodiment of a system for storing toggle states associated with a software application. In the example shown, system 100 includes a computing device 104 running in environment 102. Environment 102 may be a production environment, a test environment, a sandbox environment, etc. Computing device 104 may be a server, a computer, a laptop, a desktop, a tablet, a smart device, etc. Computing device 104 is configured to host and execute software application 106. Computing device 104 may be associated with a tenant. A tenant may correspond to a user, an enterprise, an institution, a government, a business, a university, a company, etc. A tenant has a corresponding "tenant id" value.

Although FIG. 1 depicts a computing device 104 hosting a single software application 106, environment 102 may include n computing devices, each computing device hosting one or more software applications. In some embodiments, a tenant is associated with a plurality of computing devices. In some embodiments, a tenant is associated with a plurality of applications hosted by a computing device. In some embodiments, a first tenant is associated with a first set of applications hosted by a computing device and one or more other tenants are associated with one or more other sets of applications hosted by the computing device.

Computing device 104 is coupled to analysis system 112 via connection 110. Connection 110 may be a wired or wireless connection. Connection 110 may be a local area network (LAN), a wide area network (WAN), a storage area network (SAN), a virtual private network (VPN), a metropolitan area network (MAN), intranet, the Internet, and/or a combination thereof. Analysis system 112 may be a server, a computer, a laptop, a desktop, a tablet, a smart device, etc.

Analysis system 112 includes memory 114, storage 116, and toggle state analyzer 118. In some embodiments, analysis system 112 is not included in environment 102.

Computing device 104 is coupled to developer system 122 via connection 120. Connection 120 may be a wired or wireless connection. Connection 120 may be a LAN, a WAN, a SAN, a VPN, a MAN, intranet, the Internet, and/or a combination thereof. Developer system 122 may be a server, a computer, a laptop, a desktop, a tablet, a smart device, etc. Developer system 122 includes memory 124, storage 126, and feature developer 128. In some embodiments, developer system 122 is not included in environment 102.

In some embodiments, computing device 104, analysis system 112, and developer system 122 are the same device. In some embodiments, computing device 104, analysis system 112, and developer system 122 are different devices. In some embodiments, at least one of computing device 104, analysis system 112, and developer system 122 are the same device devices.

Software application 106 is comprised of a plurality of code paths. Each code path is associated with a corresponding toggle. Developer system 122 deploys an initial version of software application 106 to computing device 104. The initial version of software application 106 includes a first plurality of code paths and corresponding toggle states. In some embodiments, a toggle state associated with a code path has an initial state of "TRUE." In some embodiments, a toggle state associated with a code path has an initial state of "FALSE."

After the initial version of software application 106 is executed, toggle state analyzer 118 analyzes the toggle states and stores the determined toggle states in a toggle state data structure, which is stored in storage 116. An initial state of the toggle state data structure generated by other systems may be:

| Tenant_id | Patching Week | Datetime | Toggle Name | Toggle_state |
|---|---|---|---|---|
| 1 | Week 1 | Jan. 7, 2022@17:22:00 | TOGGLE_A | FALSE |
| 1 | Week 1 | Jan. 7, 2022@17:22:00 | TOGGLE_B | FALSE |
| 1 | Week 1 | Jan. 7, 2022@17:22:00 | TOGGLE_C | FALSE |

Software application 106 may be updated. Other systems may store a corresponding entry for each toggle when the software application is updated. An example toggle data structure generated by the other systems for software application 106 that is updated over a six-week period may be:

| Tenant_id | Patching Week | Datetime | Toggle Name | Toggle_state |
|---|---|---|---|---|
| 1 | Week 1 | Jan. 7, 2022@17:22:00 | TOGGLE_A | FALSE |
| 1 | Week 1 | Jan. 7, 2022@17:22:00 | TOGGLE_B | FALSE |
| 1 | Week 1 | Jan. 7, 2022@17:22:00 | TOGGLE_C | FALSE |
| 1 | Week 2 | Jan. 14, 2022@17:20:00 | TOGGLE_A | FALSE |
| 1 | Week 2 | Jan. 14, 2022@17:20:00 | TOGGLE_B | FALSE |
| 1 | Week 2 | Jan. 14, 2022@17:20:00 | TOGGLE_C | FALSE |
| 1 | Week 3 | Jan. 21, 2022@17:24:39 | TOGGLE_A | TRUE |
| 1 | Week 3 | Jan. 21, 2022@17:24:39 | TOGGLE_B | FALSE |
| 1 | Week 3 | Jan. 21, 2022@17:24:39 | TOGGLE_C | FALSE |
| 1 | Week 4 | Jan. 28, 2022@17:21:23 | TOGGLE_A | TRUE |
| 1 | Week 4 | Jan. 28, 2022@17:21:23 | TOGGLE_B | TRUE |
| 1 | Week 4 | Jan. 28, 2022@17:21:23 | TOGGLE_C | FALSE |
| 1 | Week 5 | Feb. 4, 2022@17:25:42 | TOGGLE_A | TRUE |
| 1 | Week 5 | Feb. 4, 2022@17:25:42 | TOGGLE_B | TRUE |
| 1 | Week 5 | Feb. 4, 2022@17:25:42 | TOGGLE_C | TRUE |
| 1 | Week 6 | Feb. 11, 2022@17:20:34 | TOGGLE_A | TRUE |
| 1 | Week 6 | Feb. 11, 2022@17:20:34 | TOGGLE_B | TRUE |

Storing entries for the toggle states associated with all of the different code paths, regardless of whether a code path was executed, is an inefficient use of storage resources. The initial toggle state data structure generated by toggle state analyzer 118 may be:

| Tenant_id | Seq_no | Toggle_name | Start_version | Version | Start_datetime | Last_datetime | Toggle_state |
|---|---|---|---|---|---|---|---|
| 1 | 1 | TOGGLE_A | Version 1 | Version 1 | Jan. 7, 2022 @17:22:00 | Jan. 7, 2022 @17:22:00 | FALSE |
| 1 | 1 | TOGGLE_B | Version 1 | Version 1 | Jan. 7, 2022 @17:22:00 | Jan. 7, 2022 @17:22:00 | FALSE |
| 1 | 1 | TOGGLE_C | Version 1 | Version 1 | Jan. 7, 2022 @17:22:00 | Jan. 7, 2022 @17:22:00 | FALSE |

In the above example, the toggle state for "TOGGLE_A" changed at week 3, the toggle state for "TOGGLE_B" changed at week 4, and the toggle state for "TOGGLE_C" changed at week 5. Each time the software application is updated, the analysis system updates the "sequence number" value and the "version" value in the entry associated with the toggle. The "sequence number" value is updated to be the sequence number associated with the current version of the software application. The "version" value in the entry associated with the toggle is updated to be version number of the current version of the software application. Instead of storing entries for all toggles, regardless of whether they changed from a previous update, toggle state analyzer 118 is configured to update the toggle state data structure to include rows corresponding change states of toggles and/or new toggles.

For example, toggle state analyzer 118 may update the toggle state data structure to be:

| Tenant_id | Seq_no | Toggle_name | Start_version | Version | Start_datetime | Last_datetime | Toggle_state |
|---|---|---|---|---|---|---|---|
| 1 | 2 | TOGGLE_A | Version 1 | Version 2 | Jan. 7, 2022 @17:22:00 | Jan. 14, 2022 @17:20:00 | FALSE |
| 1 | 3 | TOGGLE_B | Version 1 | Version 3 | Jan. 7, 2022 @17:22:00 | Jan. 21, 2022 @17:24:39 | FALSE |
| 1 | 4 | TOGGLE_C | Version 1 | Version 4 | Jan. 7, 2022 @17:22:00 | Jan. 28, 2022 @17:21:23 | FALSE |
| | 6 | TOGGLE_A | Version 3 | Version 6 | Jan. 21, 2022 @17:24:39 | Feb. 11, 2022 @17:20:34 | TRUE |
| | 6 | TOGGLE_B | Version 4 | Version 6 | Jan. 28, 2022 @17:21:23 | Feb. 11, 2022 @17:20:34 | TRUE |
| | 6 | TOGGLE_C | Version 5 | Version 6 | Feb. 4, 2022 @17:25:42 | Feb. 11, 2022 @17:20:34 | TRUE |

In the above example, the number of entries stored by the toggle state data structure has been reduced from 18 entries to 6 entries. Software application 106 may be comprised of thousands of different code paths. New features may be added to the software application on a regular schedule. Features may be enabled or deactivated. Logging in storage 116 all of the toggle states each time software application 106 is executed may cause storage 116 to run out of storage or require additional storage to be added to analysis system 112. Logging the toggle state changes reduces the rate at which storage 116 is used to store the toggle states as software application 116 is updated over time.

Developer system 122 may utilize feature developer 128 to develop one or more features and update software application 106 by rolling out the one or more features. In some embodiments, a toggle state associated with a feature is "TRUE." In some embodiments, a toggle state associated with a feature is "FALSE." Toggle state analyzer 118 is configured to analyze the updated version of software application 106 and update the toggle state data structure based on the analysis. For example, software application 106 may be updated to include feature D and E. The toggle state data structure may be updated to include the following entries:

| Tenant_id | Seq_no | Toggle_name | Start_version | Version | Start_datetime | Last_datetime | Toggle_state |
|---|---|---|---|---|---|---|---|
| 1 | 7 | ToggleD | Version 7 | Version 7 | Feb. 14, 2022 @17:22:00 | Feb. 14, 2022 @17:22:00 | TRUE |
| 1 | 7 | ToggleE | Version 7 | Version 7 | Feb. 14, 2022 @17:22:00 | Feb. 14, 2022 @17:22:00 | FALSE |

This indicates that the code path associated with Toggle D was enabled and the code path associated with Toggle E was not activated.

Analysis system 112 is configured to receive from a client device (not shown) a request to determine states of toggles associated with a version of software application 106 at a particular moment in time. The client device may be a laptop, server, desktop, tablet, smart device, etc. Toggle state analyzer 118 may inspect the toggle state data structure that is stored in storage 116 to determine states of toggles associated with the requested version of software application 106. In some embodiments, the particular moment in time corresponds to a current state of the toggles associated with software application 106. In some embodiments, the particular moment in time corresponds to a previous state of the toggles associated with software application 106. An entry for a toggle includes a "start datetime" value and a "latest datetime" value. This represents the timeframe during which the toggle has the value indicated by the entry. The toggle state analyzer 118 determines the toggles that have corresponding timeframes that include the particular moment in time and provides the toggles names and corresponding states to the client device.

Analysis system 112 is configured to receive from a client device a request to determine one or more differences between two versions of software application 106. Toggle state analyzer 118 may inspect the toggle state data structure that is stored in storage 116 to determine the states of toggles associated with a first version of software application 106 and the states of toggles associated with a second version of software application 106. Toggle state analyzer 118 identifies the one or more toggle state differences based on the determined toggle states associated with the first version of software application 106 and the determined toggle states associated with the second version of software application 106. Analysis system 112 provides to the client device results indicating the one or more differences between the two versions of software application 106.

Figure 2:
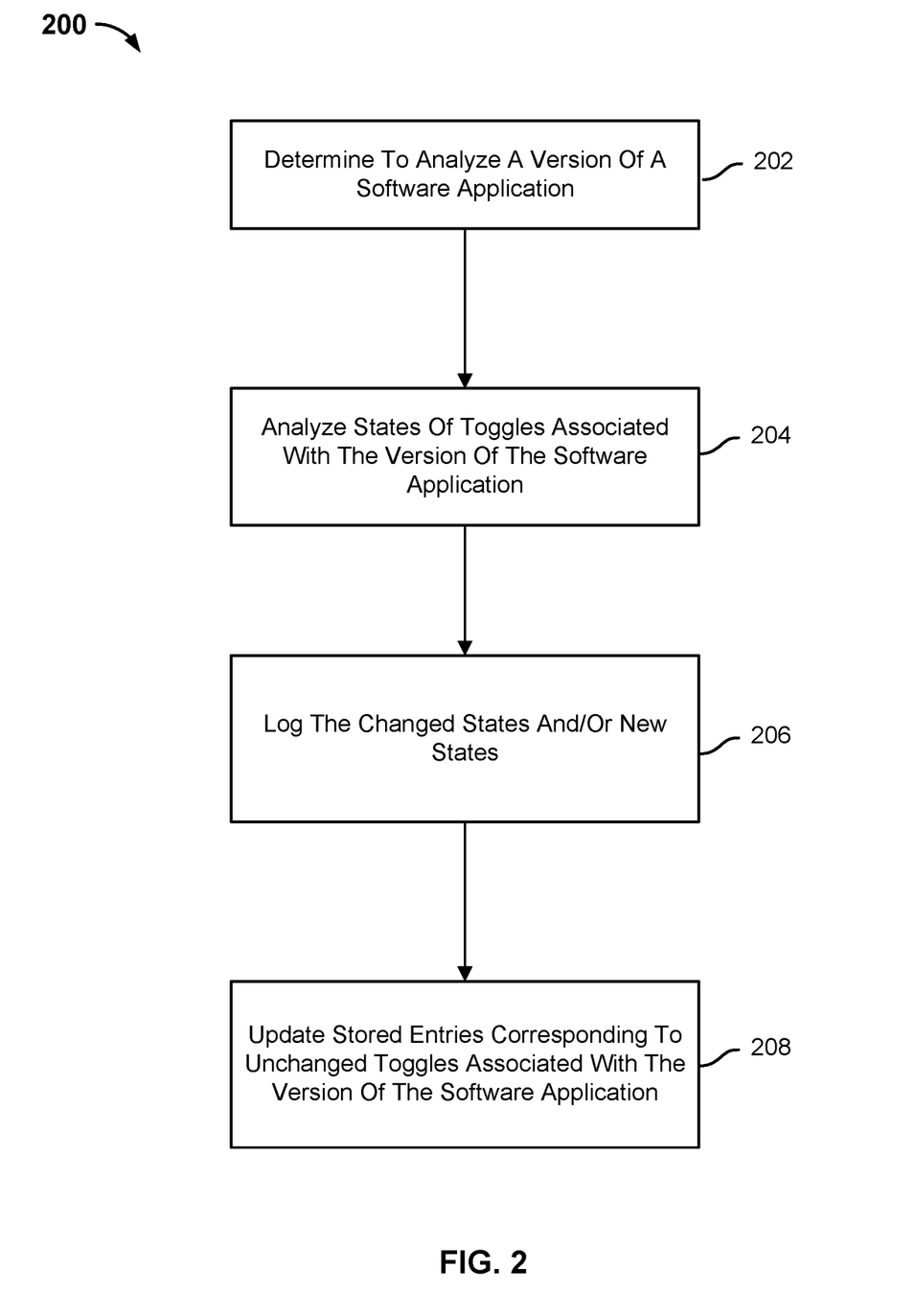
FIG. 2 is a flow diagram illustrating a process of storing toggle states in accordance with some embodiments.

FIG. 2 is a flow diagram illustrating a process of storing toggle states in accordance with some embodiments. In the example shown, process 200 may be implemented by an analysis system, such as analysis system 112.

At 202, a version of a software application is determined to be analyzed. The analysis system may determine to analyze the software application based on an analysis schedule (e.g., every Friday) or in response to a user command. The software application is comprised of a plurality of different code paths. A code path is associated with a toggle. An enabled toggle allows a code path associated with the toggle to be executed during runtime. A developer or debugger may select which toggles are enabled when the version of the software application is executed. In some embodiments, some of the toggles associated with the code paths are enabled. In some embodiments, all of the toggles associated with the code paths are enabled. In some embodiments, none of the toggles associated with the code paths are enabled. In some embodiments, a toggle state associated with a code path has a state of "TRUE." In some embodiments, a toggle state associated with a code path has a state of "FALSE."

At 204, states of toggles associated with the version of the software application are analyzed to identify changed states of at least a portion of the toggles. The analysis system utilizes a toggle state data structure to determine whether any of the states of toggles associated with the version of the software application have changed from a previously stored state. In some embodiments, the previously stored state is the initial state associated with a toggle. In some embodiments, the previously stored state is a subsequent state associated with a toggle.

The toggle state data structure is comprised of a plurality of entries. Each entry associates a toggle with one or more of: a "tenant identifier" value, a "sequence number" value, a "toggle name" value, a "start version" value, a "version" value, a "start datetime" value, a "latest datetime" value, and/or a "toggle state" value. The "tenant identifier" value indicates a tenant to which the software application is associated. The "sequence number" value indicates a software application iteration for the software application. For example, the software application may be updated (e.g., once a week, in response to a user command by turning on/off toggles) and the "sequence number" increments (e.g., by 1) each time the software application is updated. The "toggle name" value indicates a name of the toggle." The "start version" value indicates a version of the software application in which the code path associated with the toggle was deployed. The "version" value indicates the most recent version of the software application that includes the toggle having the toggle state. The "toggle state" value indicates a state of the toggle.

The "start datetime" value indicates a point in time for the initial value associated with the toggle. The "last datetime" value indicates the last time the toggle had the toggle state stored in the toggle state data structure. The "start datetime" value and the "latest datetime" value represent a time frame during which the toggle has the value indicated by the entry.

At 206, changed and/or new states of toggles associated with the version of the software application are logged.

The analysis system utilizes the toggle state data structure to compare a current state associated with a toggle to a stored state associated with the toggle and to determine whether a state associated with the toggle has changed. In some embodiments, a toggle state has changed from "TRUE" to "FALSE." In some embodiments, a toggle state has changed from "FALSE" to "TRUE."

In response to a determination that the toggle state has changed, the analysis system logs the change by updating the toggle state data structure to include a new entry for the toggle and modifying the previous entry associated with the toggle. The new entry may associate the toggle with a "tenant identifier" value, a "sequence number" value, a "toggle name" value, a "start version" value, a "version" value, a "start datetime" value, a "last datetime" value, and/or a "toggle state" value. The "sequence number" value is updated to indicate the software application analysis iteration at which the toggle value changed.

The "sequence number" value and "last datetime" value of the previous entry associated with the toggle are modified. The "sequence number" value is updated to be one less than the current sequence number associated with the software application. For example, the current sequence number may be n and the "sequence number" value for the previous entry associated with the toggle is modified to be (n−1). The "latest datetime" value is updated to be the point in time at which the previous version of the software application was executed.

In some embodiments, the toggle state data structure does not include an entry for the toggle, i.e., the code path associated with the toggle is a new feature. In response to a determination that the toggle state data structure does not include an entry for the toggle, the analysis system updates the toggle state data structure to include an entry for the toggle. The new entry may associate the toggle with a "tenant identifier" value, a "sequence number" value, a "toggle name" value, a "start version" value, a "version" value, a "start datetime" value, a "last datetime" value, and/or a "toggle state" value.

At 208, stored entries corresponding to unchanged toggles associated with the version of the software application are updated. In response to a determination that the toggle state has changed, the analysis system updates the "sequence number, the "version" value, and the "last datetime" value in the entry associated with the toggle. The "sequence number" value is updated to be the sequence number associated with the current version of the software application. The "version" value in the entry associated with the toggle is updated to be version number of the current version of the software application. This indicates that the stored state associated with the toggle is the state of the toggle in the current version of the software application. The "latest datetime" value is updated to be the point in time at which the current version of the software application was executed.

Figure 3:
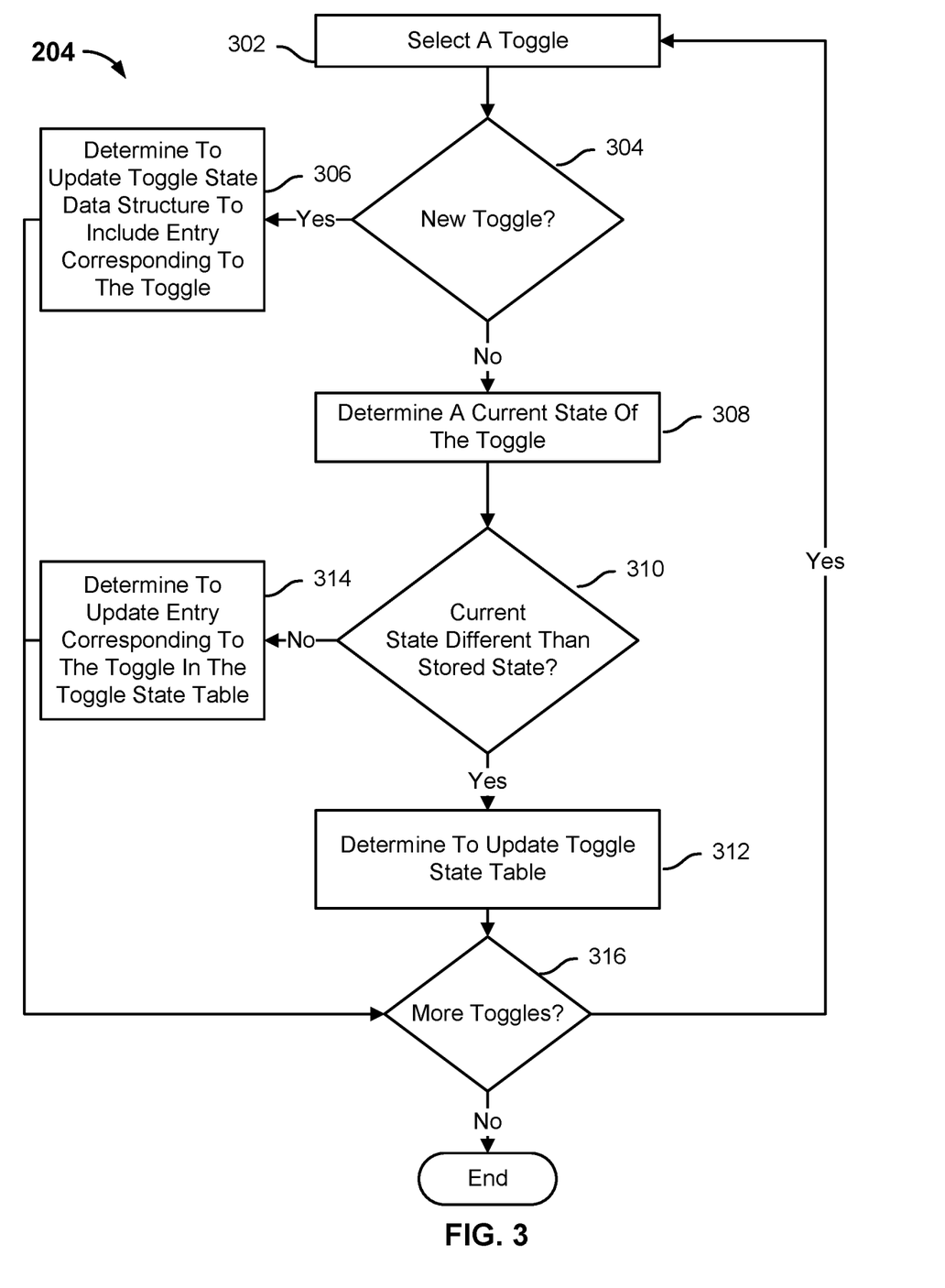
FIG. 3 is a flow diagram illustrating a process of analyzing toggle states in accordance with some embodiments.

FIG. 3 is a flow diagram illustrating a process of analyzing toggle states in accordance with some embodiments. In example shown, process 300 may be implemented by an analysis system, such as analysis system 112. In some embodiments, process 300 is implemented to perform some or all of step 204 of process 200.

A toggle state data structure is comprised of a plurality of entries (e.g., rows). Each row corresponds to a toggle. At 302, a toggle is selected. At 304, it is determined whether the selected toggle is a new toggle. The analysis system determines whether the toggle state data structure includes an entry corresponding to the toggle. In response to a determination that the selected toggle is a new toggle, i.e., the toggle state data structure does not include an entry corresponding to the toggle, process 300 proceeds to 306. In response to a determination that the selected toggle is not a new toggle, process 300 proceeds to 308.

At 306, the toggle state data structure is determined to be updated to include an entry corresponding to the toggle. The new entry may associate the toggle with one or more of the following: a "tenant identifier" value a "sequence number" value, a "toggle name" value, a "start version" value, a "version" value, a "start datetime" value, a "latest datetime" value, and a "toggle state" value.

At 308, a current state of the toggle is determined. At 310, it is determined whether a current state of the toggle is different than a stored state of the toggle. In response to a determination that the current state of the toggle is different than a stored state of the toggle, process 300 proceeds to 312. For example, a current state of the toggle is "FALSE" and the stored state of the toggle is "TRUE" or the current state of the toggle is "TRUE" and the stored state of the toggle is "FALSE."

In response to a determination that the current state of the toggle is not different than a stored state of the toggle, process 300 proceeds to 314. For example, a current state of the toggle is "FALSE" and the stored state of the toggle is "FALSE" or the current state of the toggle is "TRUE" and the stored state of the toggle is "TRUE."

At 312, a toggle state data structure is determined to be updated. The toggle state data structure is updated by including a new entry for the changed toggle state associated with the toggle and modifying the entry corresponding to the previous state of the toggle. The new entry may associate the toggle with a "tenant identifier" value a "sequence number" value, a "toggle name" value, a "start version" value, a "version" value, a "start datetime" value, a "latest datetime" value, and/or a "toggle state" value.

The entry corresponding to the previous state of the toggle is modified by updating the "sequence number" value and "last_datetime" value of the previous entry associated with the toggle. The "sequence number" value is updated to be one less than the current sequence number associated with the software application. For example, the current sequence number may be n and the "sequence number" value for the previous entry associated with the toggle is modified to be (n−1). The "latest datetime" value is updated to be the point in time at which the previous version of the software application was executed.

At 314, the entry corresponding to the toggle in the toggle state data structure is determined to be updated. The "sequence number," the "version" value, and "last datetime" values for the toggle are updated. The "sequence number" value is updated to be the sequence number associated with the current version of the software application. The "version" value in the entry associated with the toggle is updated to be version number of the current version of the software application. This indicates that the stored state associated with the toggle is the state of the toggle in the current version of the software application. The "latest datetime" value is updated to be the point in time at which the current version of the software application was executed.

At 316, it is determined whether there are one or more toggles to analyze. In response to a determination that there are one or more toggles to analyze, process 300 returns to 302. In response to a determination that there are no more toggles to analyze, process 300 ends.

Figure 4:
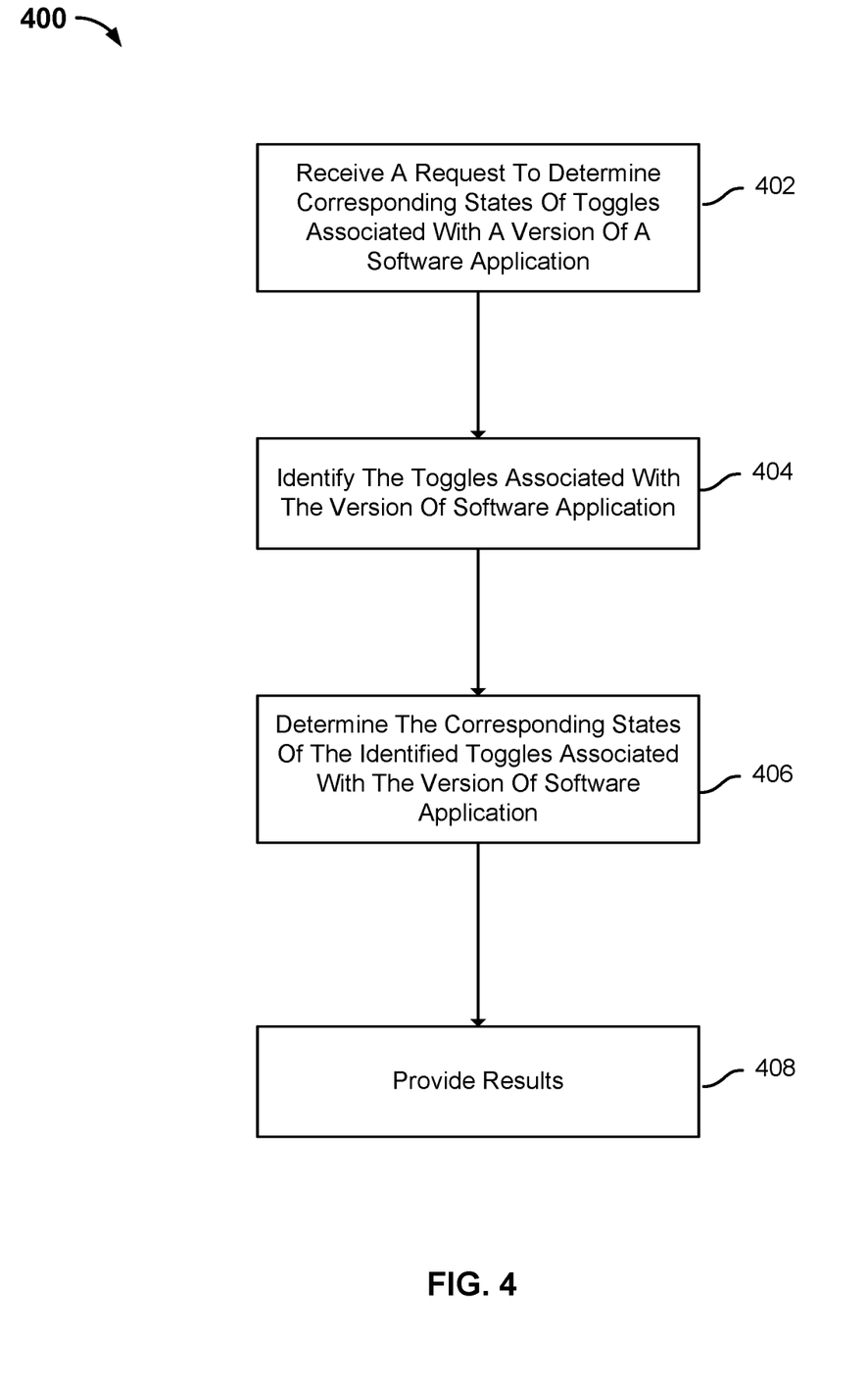
FIG. 4 is a flow diagram illustrating a process of determining states of toggles associated with a version of a software application in accordance with some embodiments.

FIG. 4 is a flow diagram illustrating a process of determining states of toggles associated with a version of a software application in accordance with some embodiments. In the example shown, process 400 may be implemented by an analysis system, such as analysis system 112.

At 402, a request to determine corresponding states of toggles associated with a version of a software application at a particular moment in time is received. In some embodiments, the particular moment in time corresponds to a state of a current version of the toggles associated with the software application. In some embodiments, the particular moment in time corresponds to a previous state of the toggles associated with a previous version of the software application.

At 404, the toggles associated with the version of the software application are identified. The analysis system inspects the toggle state data structure to determine which toggles are associated with the requested version of the software application. An entry for a toggle includes a "start datetime" value and a "latest datetime" value. This represents the timeframe during which the toggle has the value indicated by the entry. The analysis system determines the toggles that have corresponding timeframes that include the particular moment in time. Storing the timeframe during which a toggle has a particular state enables the analysis system to efficiently determine whether a toggle is relevant (e.g., requested point in time is included or excluded from timeframe associated with the toggle) and if relevant, a state of the toggle at the requested point in time.

At 406, the corresponding states of the identified toggles associated with the version of the software application are determined.

At 408, the results are provided.

Figure 5:
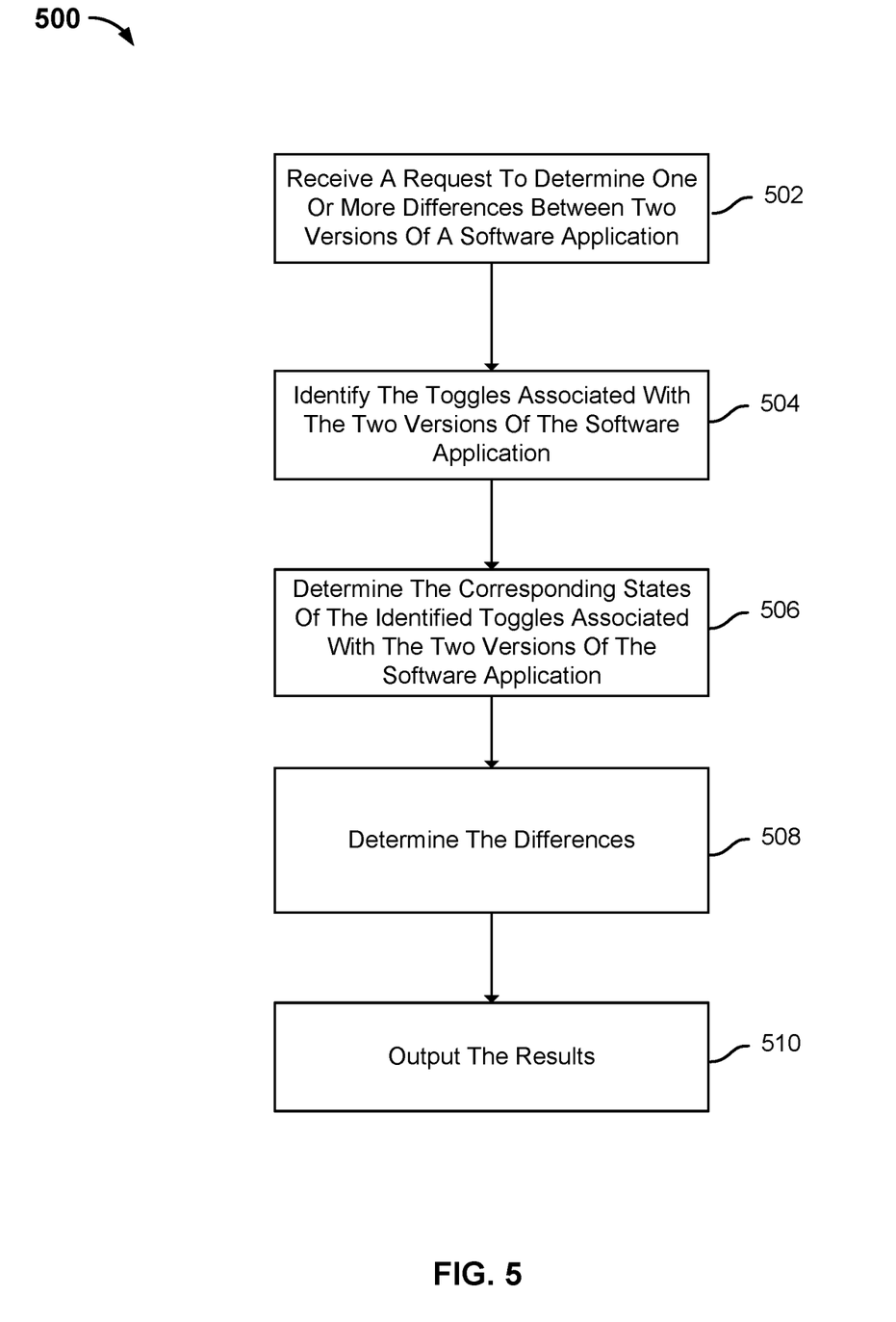
FIG. 5 is a flow diagram illustrating a process of determining toggle state differences between two versions of a software application in accordance with some embodiments.

FIG. 5 is a flow diagram illustrating a process of determining toggle state differences between two versions of a software application in accordance with some embodiments. In the example shown, process 500 may be implemented by an analysis system, such as analysis system 112.

At 502, a request to determine one or more differences between two versions of a software application is received. A first version of the software application corresponds to a first particular moment in time (e.g., Version 2 of the example above). A second version of the software application corresponds to a second particular moment in time (e.g., Version 3 of the example above).

At 504, the toggles associated with the two versions of the software application are identified. The analysis system inspects the toggle state data structure to determine which toggles are associated with the requested version of the software application. An entry for a toggle includes a "start datetime" value and a "latest datetime" value. This represents the timeframe during which the toggle has the value indicated by the entry. The analysis system determines the toggles that have corresponding timeframes that include the first particular moment in time and the second particular moment in time.

At 506, the corresponding states of the identified toggles associated with the two versions of the software application are determined. For example, in version 2, "TOGGLE_A" has a state of "FALSE," "TOGGLE_B" has a state of "FALSE," and "TOGGLE_C" has a state of "FALSE." In version 3, "TOGGLE_A" has a state of "TRUE," "TOGGLE_B" has a state of "FALSE," and "TOGGLE_C" has a state of "FALSE."

At 508, one or more differences between the two versions of the software application are determined. In some embodiments, the state associated with a toggle is the same in both versions of the software application. For example, the states of "TOGGLE_B" and "TOGGLE_C" are the same in version 2 and version 3 of the software application.

In some embodiments, the state associated with a toggle is different between the versions of the software application. For example, the states of "TOGGLE_A" are different in version 2 and version 3 of the software application.

At 510, the results are provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
deploying a first version of a software application to a computing device in a production environment, wherein the first version of the software application includes a first plurality of code paths and corresponding toggle states;
storing in a toggle state data structure the corresponding toggle states associated with all of the first plurality of code paths;
generating an updated version of the software application, wherein the updated version of the software application includes a second plurality of code paths and corresponding toggle states, wherein at least one code path associated with the updated version of the software application was not included in the first plurality of code paths;
debugging the updated version of the software application in part by:
analyzing the corresponding toggle states associated with the second plurality of code paths;
identifying a first toggle state associated with a first code path that has changed between the first version of the software application and the updated version of the software application, and at least one code path associated with the updated version of the software application that was not included in the first plurality of code paths, wherein a changed state of changed toggle states comprises a state of a toggle of a plurality of toggles that has changed between the updated version of the software application and a previous version of the software application, and wherein the changed state has a corresponding time frame and a corresponding sequence number; and
logging the corresponding toggle states associated with the second plurality of code paths in part by updating the toggle state data structure to include a new entry for the at least one code path associated with the updated version of the software application that was not included in the first plurality of code paths, a new entry for the first toggle state associated with the first code path that has changed between the first version of the software application and the updated version of the software application, and modifying a previous entry associated with the first toggle state associated with the first code path that has changed between the first version of the software application and the updated version of the software application to indicate a version of the software application that the first code path was executed; and
updating the first version of the software application by deploying the updated version of the software application to the computing device in the production environment.

2. The method of claim 1, wherein analyzing the corresponding toggle states associated with the second plurality of code includes selecting a first toggle of the toggles.

3. The method of claim 2, wherein analyzing the corresponding toggle states associated with the second plurality of code paths includes determining whether the selected toggle is a new toggle.

4. The method of claim 3, wherein the selected toggle is the new toggle based on whether the toggle state data structure includes an entry for the selected toggle.

5. The method of claim 3, wherein in response to determining that the selected toggle is the new toggle, updating the toggle state data structure to include an entry corresponding to the selected toggle.

6. The method of claim 3, wherein in response to determining that the selected toggle is the new toggle, determining a current state of the selected toggle.

7. The method of claim 6, further comprising determining whether the current state of the selected toggle is different than a stored state associated with the selected toggle.

8. The method of claim 7, further comprising updating an entry corresponding to the selected toggle in response to determining that the current state of the selected toggle is not different than the stored state associated with the selected toggle.

9. The method of claim 7, wherein the toggle state data structure is updated to include the new entry corresponding to the changed state in response to determining that the current state of the selected toggle is different than the stored state associated with the selected toggle.

10. The method of claim 1, further comprising logging one or more states associated with one or more new toggles associated with the second plurality of code paths.

11. The method of claim 1, further comprising updating stored entries corresponding to unchanged toggles associated with the updated version of the software application.

12. The method of claim 1, further comprising receiving a request to determine the states of the toggles associated with the updated version of the software application.

13. The method of claim 12, further comprising identifying the toggles associated with the updated version of the software application based on timeframes associated with the toggles.

14. The method of claim 13, further comprising:
determining corresponding states of the identified toggles associated with the updated version of the software application; and
providing a result of the determined states.

15. The method of claim 1, further comprising receiving a request to determine one or more differences between the updated version of the software application and a second version of the software application.

16. The method of claim 15, further comprising identifying toggles associated with the updated version of the software application and toggles associated with the second version of the software application.

17. The method of claim 16, further comprising determining corresponding states of the identified toggles associated with the updated version of the software application and corresponding states of the identified toggles associated with the second version of the software application.

18. The method of claim 17, further comprising:
determining one or more differences between the determined corresponding states of the identified toggles associated with the updated version of the software application and the determined corresponding states of the identified toggles associated with the second version of the software application; and
providing a result of the one or more determined differences.

19. A system, comprising:
a processor configured to:
deploy a first version of a software application to a computing device in a production environment, wherein the first version of the software application includes a first plurality of code paths and corresponding toggle states;
store in a toggle state data structure the corresponding toggle states associated with all of the first plurality of code paths;
generate an updated version of the software application, wherein the updated version of the software application includes a second plurality of code paths and corresponding toggle states, wherein at least one code path associated with the updated version of the software application was not included in the first plurality of code paths;
debug the updated version of the software application in part by:
analyze the corresponding toggle states associated with the second plurality of code paths;
identifying a first toggle state associated with a first code path that has changed between the first version of the software application and the updated version of the software application, and at least one code path associated with the updated version of the software application that was not included in the first plurality of code paths, wherein a changed state of changed toggle states comprises a state of a toggle of a plurality of toggles that has changed between the updated version of the software application and a previous version of the software application, and wherein the changed state has a corresponding time frame and a corresponding sequence number; and
log the corresponding toggle states associated with the second plurality of code paths in part by updating the toggle state data structure to include a new entry for the at least one code path associated with the updated version of the software application that was not included in the first plurality of code paths, a new entry for the first toggle state associated with the first code path that has changed between the first version of the software application and the updated version of the software application, and modifying a previous entry associated with the first toggle state associated with the first code path that has changed between the first version of the software application and the updated version of the software application to indicate a version of the software application that the first code path was executed; and
update the first version of the software application by deploying the updated version of the software application to the computing device in the production environment; and
a memory coupled to the processor and configured to provide the processor with instructions.

20. A computer program product embodied in a non-transitory computer readable medium and comprising computer instructions for:
deploying a first version of a software application to a computing device in a production environment, wherein the first version of the software application includes a first plurality of code paths and corresponding toggle states;
storing in a toggle state data structure the corresponding toggle states associated with all of the first plurality of code paths;
generating an updated version of the software application, wherein the updated version of the software application includes a second plurality of code paths and corresponding toggle states, wherein at least one code path associated with the updated version of the software application was not included in the first plurality of code paths;
debugging the updated version of the software application in part by:
analyzing the corresponding toggle states associated with the second plurality of code paths;
identifying a first toggle state associated with a first code path that has changed between the first version of the software application and the updated version of the software application, and at least one code path associated with the updated version of the software application that was not included in the first plurality of code paths, wherein a changed state of changed toggle states comprises a state of a toggle of a plurality of toggles that has changed between the updated version of the software application and a previous version of the software application, and wherein the changed state has a corresponding time frame and a corresponding sequence number; and
logging the corresponding toggle states associated with the second plurality of code paths in part by updating the toggle state data structure to include a new entry for the at least one code path associated with the updated version of the software application that was not included in the first plurality of code paths, a new entry for the first toggle state associated with the first code path that has changed between the first version of the software application and the updated version of the software application, and modifying a previous entry associated with the first toggle state associated with the first code path that has changed between the first version of the software application and the updated version of the software application to indicate a version of the software application that the first code path was executed; and updating the first version of the software application by deploying the updated version of the software application to the computing device in the production environment.

\* \* \* \* \*